(No Model.)
H. S. BLACKMORE.
CONDENSER.
No. 486,554. Patented Nov. 22, 1892.
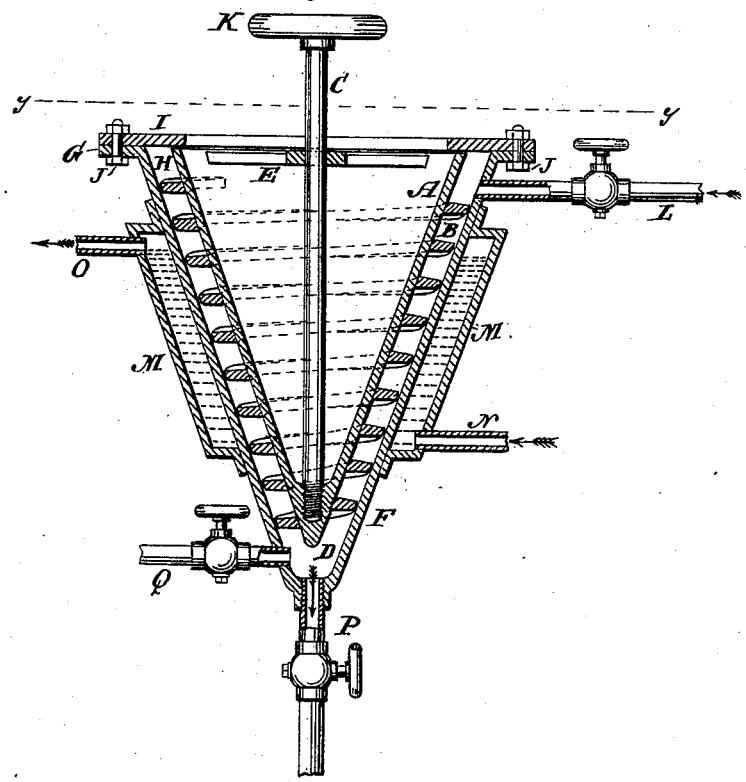
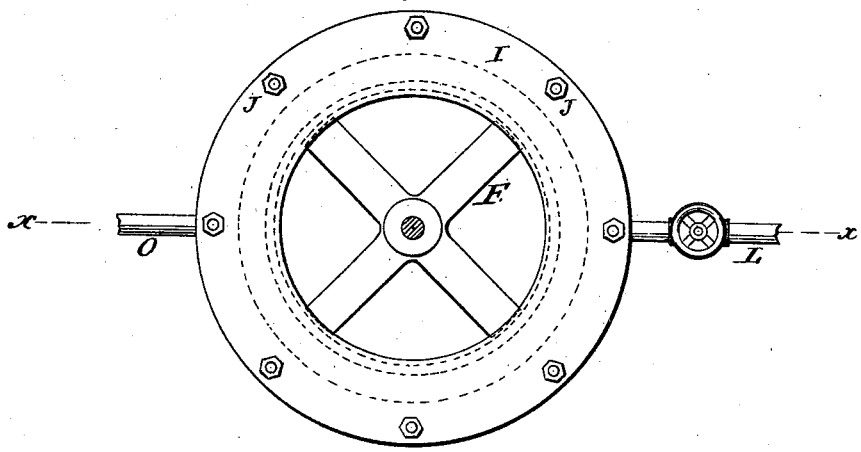
WITNESSES:
Edward Wolff
William L. Keller
INVENTOR:
Henry S. Blackmore.
BY
Van Santvoord & Hauff
his ATTORNEYS

UNITED STATES PATENT OFFICE.

HENRY S. BLACKMORE, OF MOUNT VERNON, NEW YORK.

CONDENSER.

SPECIFICATION forming part of Letters Patent No. 486,554, dated November 22, 1892

Application filed August 13, 1891. Serial No. 402,539. (No model.)

*To all whom it may concern:*

Be it known that I, HENRY S. BLACKMORE, a citizen of the United States, residing at Mount Vernon, in the county of Westchester and State of New York, have invented new and useful Improvements in Condensers, of which the following is a specification.

This invention relates to condensers; and it consists in certain new features described and pointed out in the following specification and claim, reference being had to the accompanying drawings, in which—

Figure 1 is a vertical central section, on the line $x$ $x$ of Fig. 2, of a condenser constructed in accordance with my invention. Fig. 2 is a horizontal section on the line $y$ $y$ of Fig. 1.

In the condensation of distillates by the method or apparatus commonly employed difficulty is experienced in removing the condensed material from the apparatus, as in the cases of sodium, phosphorus, potassium, and other substances where the distilled product condenses into a semi-solid or wax-like consistency, it being found necessary sometimes to take the apparatus apart in order to remove the condensed material therefrom, and, besides, where condensation takes place in a worm it is manifest that difficulty may be experienced in removing therefrom the condensed material and in cleaning the worm.

My invention comprises the employment of a funnel-shaped vessel closed at the bottom, to which rotary motion can be given and which is provided on its exterior with a diminishing-spiral flange or fusee, said rotating vessel being placed in an outer stationary vessel of similar form, but of greater diameter, in such a manner that the spiral flange will extend across the space between the two vessels, and thus form between them a diminishing-spiral groove or channel, in which the condensation takes place and through which the condensed material is expelled by the diminishing-spiral flange, being forced downward by it through the bottom of the outer vessel by the revolution of the inner vessel.

In carrying out my invention I prepare a funnel-shaped vessel A, which is closed at its bottom and upon whose exterior I secure a diminishing-spiral flange or fusee B, extending nearly from top to bottom. C is a spindle or shaft, whose lower end has its bearing in the closed bottom D of vessel A. It extends thence upward through the center of vessel A and above it, passing through the frame E, which forms a bearing for the upper part of the shaft, the arms of the frame E being suitably secured to the upper part of the vessel A.

The vessel A, with its diminishing-spiral flange or fusee B, is placed in the outer vessel F, which last-named vessel is likewise funnel-shaped and has a plain inner surface, and is of such dimensions that the outer edge of the spiral flange B will come against or close to the plain inner surface of vessel F, but not so close as to prevent the inner vessel A from being revolved in the outer vessel, it being intended that the diminishing-spiral flange shall extend across the space existing between the two vessels and form, with the plain inner surface of the outer vessel, a channel or groove of like spiral or fusee form. The top of the outer vessel F is provided with a flange G, which is level with the top of vessel A, thus enabling the top of the space H between the two vessels to be closed by the annular cover I, which is fastened in place by bolts J, which are removed when it is desired to lift the vessel A out of the vessel F in order to empty vessel A. The cover I being fastened to the top of the outer vessel F and resting on the top of vessel A, holds down the latter in the outer vessel, so as to keep the diminishing-spiral flange in proper contact with the plain surface of the outer vessel. The shaft C can be turned by means of the hand-wheel K on the shaft, and if it is desired to operate it by power suitable pulleys or gearing can be placed on the shaft for that purpose.

The distillate to be condensed is conveyed to the apparatus from a still (not shown) through the pipe L, which discharges into the space between the two vessels. While the condensing operation is going on cold oil, water, or other cooling material can be supplied to vessel A, so as to keep the apparatus cool and to hasten the condensing operation, and the water-jacket M, surrounding the apparatus, and its inlet and outlet pipes N O can be also used for that purpose, said pipes allowing a constant current of cold water to pass through the jacket.

When it is desired to discharge the condensed material from the apparatus, the vessel A is rotated by turning its shaft C, whereby the condensed material contained in the space H will, by the action thereon of the thread of the diminishing spiral, be forced downward through said space and into the discharge-pipe P, which is governed by a suitable stop-cock or valve, and which conducts it to any suitable receptacle that may be provided to receive it.

It will be observed that the inner vessel A is held in place by the inner plain surface of the outer vessel through its contact with the edge of the spiral flange, so that the vessel A is properly held and guided in its rotary movement by the plain inner surface of the outer vessel.

My invention is applicable not only to the condensing of distillates, which can be admitted into the apparatus through the inlet-pipe L, but also to condensing phosphorus and substances which condense in like form. In order to use my invention in condensing phosphorus, I introduce its vapors into the apparatus by means of the pipe Q, which enters the apparatus in the lower part of the space H, the pipe P being first closed. The vapor of phosphorus rises in the space H and on becoming condensed therein and filling the channel of the spiral is discharged therefrom by the action of the spiral flange thereon through the rotation of the vessel A, the pipe Q being closed and pipe P opened, while the condensed phosphorus is forced out through the bottom of the apparatus. In condensing phosphorus the pipe L will be connected with a water-trap to prevent it from taking fire.

By means of my invention the condensed material can be readily expelled from the apparatus, being forced downward through the spiral channel or groove by the positive action on the condensed material of the said diminishing-spiral flange.

My invention enables me not only to empty the vessel A of water or other cooling material placed therein to aid the condensation of the distillate, but also to cleanse the vessel A and its diminishing-spiral flange of all matters adhering thereto. This is readily accomplished by removing the cover I, when the vessel A and its diminishing-spiral flange can be lifted out of the apparatus and cleaned without hindrance. This is very important in such cases as the distillation and condensation of essential oils—such as peppermint, wintergreen, rose, &c.—where it would almost be impossible to remove the odor from the ordinary worm.

By my apparatus there is no difficulty in getting at the interior of the condensing part of the apparatus and removing the most tenacious odors by simply removing the cover I and lifting out the vessel A and scrubbing the same between the leaves of the spiral flange B and the inside of vessel F. If the space below the vessel A, between the same and the outlet-pipe P, becomes clogged, in the case of removing semi-solids by the revolution of vessel A, steam-heated oil or other heated material may be admitted or forced into the said space through the pipe Q, thereby melting the obstruction and allowing the same to run out through pipe P into the receiver. The valve in pipe L enables me to control and regulate the flow of the vapor into the condenser from the still. In case all the vapor that may have been discharged into the condenser is not wholly condensed the remaining vapor may be passed through a second condenser, the pipe L of the second condenser being connected with the pipe Q of the first, the condensed material passing from the several condensers through the pipes P into their respective receivers.

It is obvious that substantially the same result will be attained by making the inner vessel stationary and rotating the outer vessel and placing the diminishing-spiral flange on the inner surface of the latter, thus reversing the positions of the two vessels.

In my invention the construction of the inner and outer vessels and the diminishing spiral is such that the vapors are made to travel over a large cooling-surface in a short time on account of the cooling-surfaces being oblique to the plane of the spiral flange, and these vapors are brought into close contact with the cooling-surfaces as the circumference of the space H diminishes while the material is condensing. Where the condenser is of large diameter at the top, it is obvious that by having the same of conical shape when the condensed material therein is removed by the revolution of the inner vessel with its spiral flange the condensed material is brought together and discharged at one point—namely, at the apex of the inverted cone—into the receiver, whereas if the parts were cylindrical the condensed material would be discharged and spread in a circle of the same diameter as the top portion.

What I claim as new, and desire to secure by Letters Patent, is—

In a condenser, the combination of the inverted conical outer vessel F, having an inlet-pipe Q and a discharge-pipe P at its lower end portion and an inlet-pipe L at its upper end portion, the inverted conical inner vessel A, having its exterior provided with the spiral flange B, which gradually diminishes from the large to the small end of the inner vessel and has its outer edge in juxtaposition to the inner surface of the outer vessel, means for rotating the inner vessel, with its diminishing-spiral flange, to force the condensed material toward the discharge-pipe of the outer vessel, the movable cover I, and the water-jacket M, surrounding the outer vessel and provided with a lower inlet-pipe N and an upper outlet-pipe O, substantially as described.

In testimony whereof I have hereunto set my hand in the presence of two subscribing witnesses.

HENRY S. BLACKMORE.

Witnesses:
JOHN VAN SANTVOORD,
E. F. KASTENHUBER.